(12) United States Patent
Chang

(10) Patent No.: US 8,448,198 B2
(45) Date of Patent: May 21, 2013

(54) TRAVERSE MODULE AND OPTICAL DISC DRIVE UTILIZING THE SAME

(75) Inventor: Teng-Yuan Chang, Tu-Cheng (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 43 days.

(21) Appl. No.: 13/152,297

(22) Filed: Jun. 3, 2011

(65) Prior Publication Data
US 2012/0047522 A1  Feb. 23, 2012

(30) Foreign Application Priority Data
Aug. 19, 2010 (CN) .......................... 2010 1 0257389

(51) Int. Cl.
*G11B 7/00* (2006.01)

(52) U.S. Cl.
USPC .......................................... 720/679; 720/692

(58) Field of Classification Search
USPC .................. 720/674, 675, 676, 677, 679, 692
See application file for complete search history.

(56) References Cited

U.S. PATENT DOCUMENTS

| | | | |
|---|---|---|---|
| 8,316,388 B2 * | 11/2012 | Nishi et al. | 720/677 |
| 2002/0186646 A1 * | 12/2002 | Akiba | 369/249 |
| 2003/0235142 A1 * | 12/2003 | Chen et al. | 369/249 |
| 2005/0081225 A1 * | 4/2005 | Tanimoto et al. | 720/676 |
| 2007/0083880 A1 * | 4/2007 | Bae | 720/675 |
| 2008/0209458 A1 * | 8/2008 | Jingga et al. | 720/675 |
| 2009/0222844 A1 * | 9/2009 | Harada et al. | 720/601 |

* cited by examiner

*Primary Examiner* — Wayne Young
*Assistant Examiner* — Adam B Dravininkas
(74) *Attorney, Agent, or Firm* — Altis Law Group, Inc.

(57) ABSTRACT

A traverse module of an optical disc drive includes a base and a cover connected to the base that includes at least one spring tab integrally formed therewith. A pair of guide bars is connected to the base. A pickup head module is slidably connected to the guide bars. At least one adjusting member is movably connected to the base. The at least one adjusting member supports at least one of the guide bars and the at least one spring tab presses against the at least one of the guide bars, the at least one adjusting member is able to urge the at least one of the guide bars to move.

9 Claims, 5 Drawing Sheets

TRAVERSE MODULE AND OPTICAL DISC DRIVE UTILIZING THE SAME

BACKGROUND

1. Technical Field

The present disclosure relates to traverse modules for use in an optical disc drive and, especially to a traverse module having a simplified structure for adjusting orientation of a pickup head.

2. Description of Related Arts

A traverse module of an optical disc drive includes an optical pickup, a pair of guide bars, and a number of adjusting screws. The optical pickup is used for obtaining the data of the optical disc. The guide bars guide the optical pickup to move. The adjusting screws adjust an orientation of the guide bars to adjust the orientation of the optical pickup, such that light beam emitted by the adjusted optical pickup can be perpendicular to the optical disc. For each adjusting screw, it usually needs a corresponding coil spring, which increases cost.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

DETAILED DESCRIPTION

Embodiments of the present disclosure will now be described in detail below, with reference to the accompanying drawings.

Figure 1:
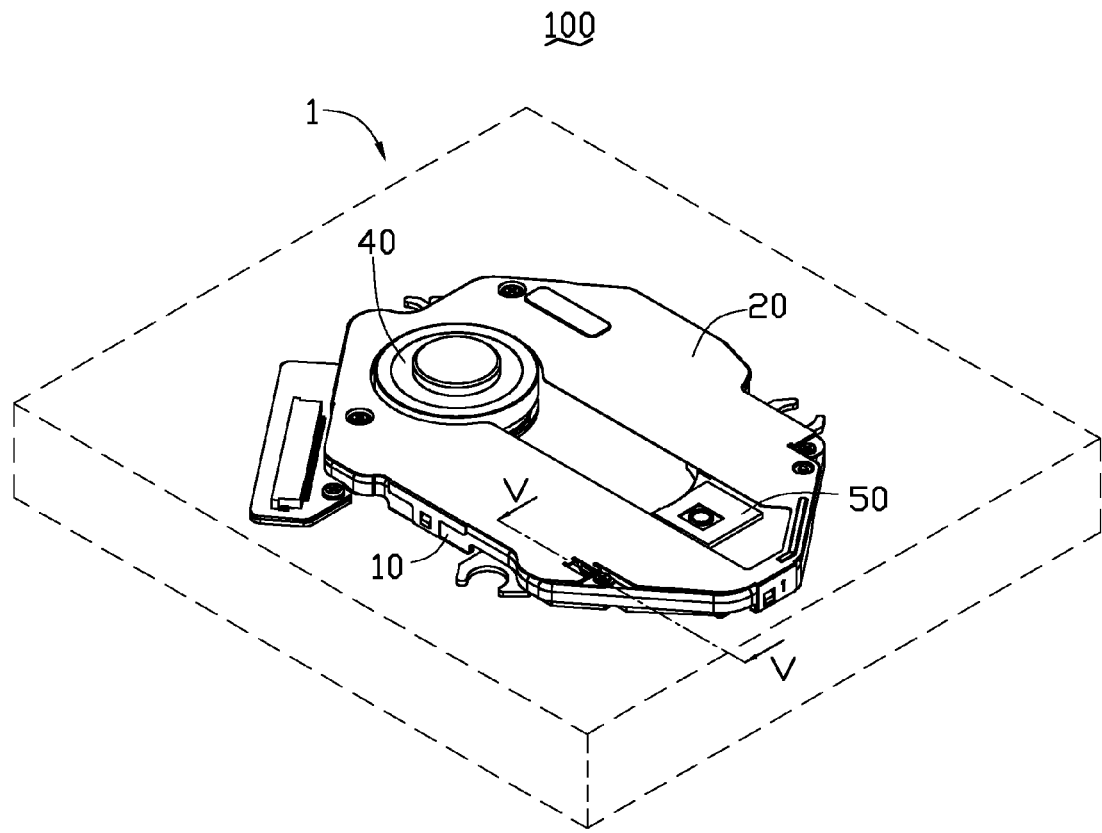
FIG. 1 is an isometric view of a traverse module of an optical disc drive according to an embodiment.

Referring to FIG. 1, an optical drive 1 includes a traverse module 100. The traverse module 100 includes a base 10, a cover 20, a motor 40, and a pickup head module 50. During operation, an optical disc is placed on and rotated by the motor 40. The pickup head module 50 projects light beam on a data layer of the optical disc to read data thereof.

Figure 3:
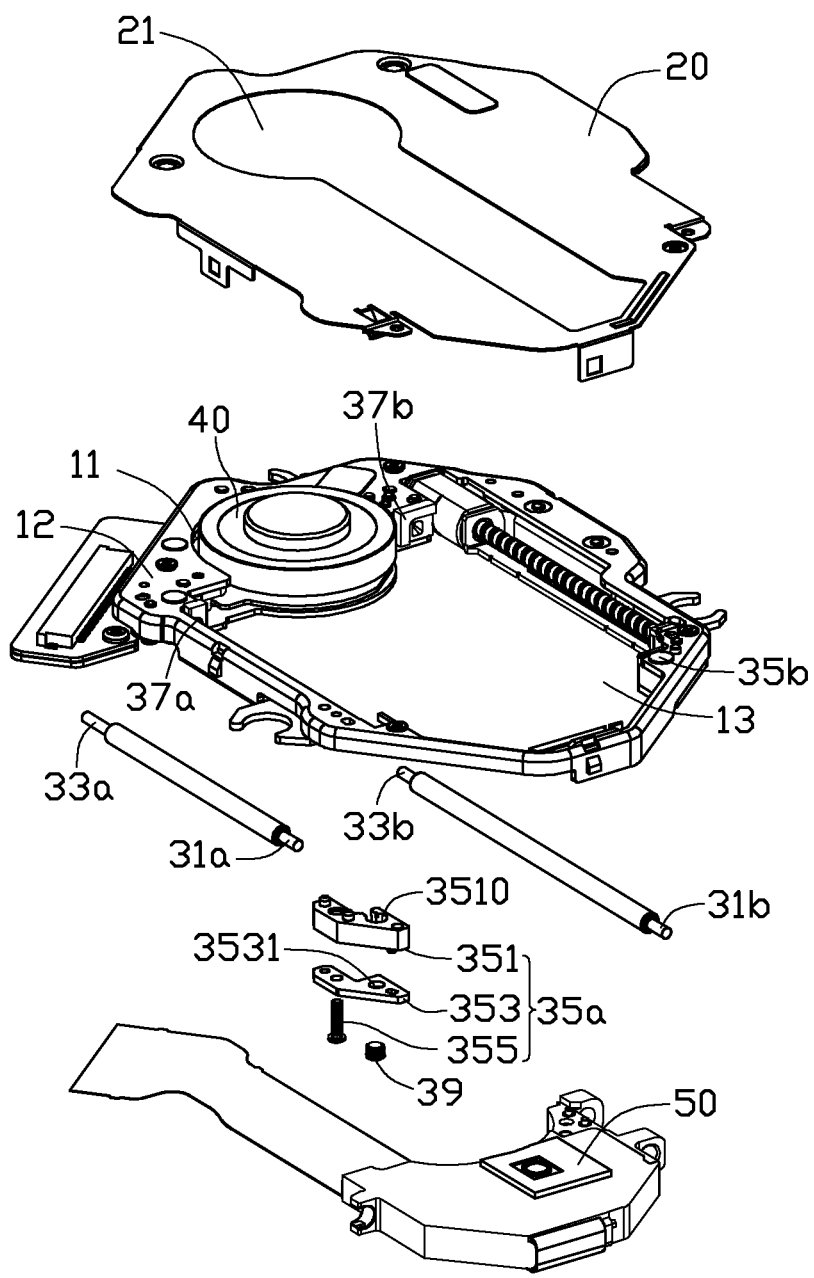

Referring to FIG. 3, the base 10 is a hollow frame that defines a hollow space 13. The base 10 includes a first end 12 defining an opening 11 that communicates with the hollow space 13. The opening 11 receives a portion of the motor 40.

The traverse 100 further includes a pair of guide bars 30a and 30b that are arranged in the hollow space 13 at opposite sides. The pickup head module 50 is slidably connected to the guide bars 30a and 30b, and can thus move along the bars 30a and 30b. The bars 30a and 30b respectively include first ends 31a, 31b, and second ends 33a, 33b.

In the embodiment, the bars 30a and 30b are connected to the base 40 via fixing members 35a, 35b, 37a, and 37b. The fixing member 35a is arranged adjacent to a second end of the base 10 and includes a seat 351 and a support plate 353. The seat 351 is sandwiched between the base 10 and the support plate 353. A bolt 355 passes through the seat 351 and the support plate 353 and screws into the base 10, thereby fixing the seat 351 and the support plate 353 to the base 10. The seat 351 defines an open cavity 3510 to receive the end 31a of the bar 30a.

Figure 5:
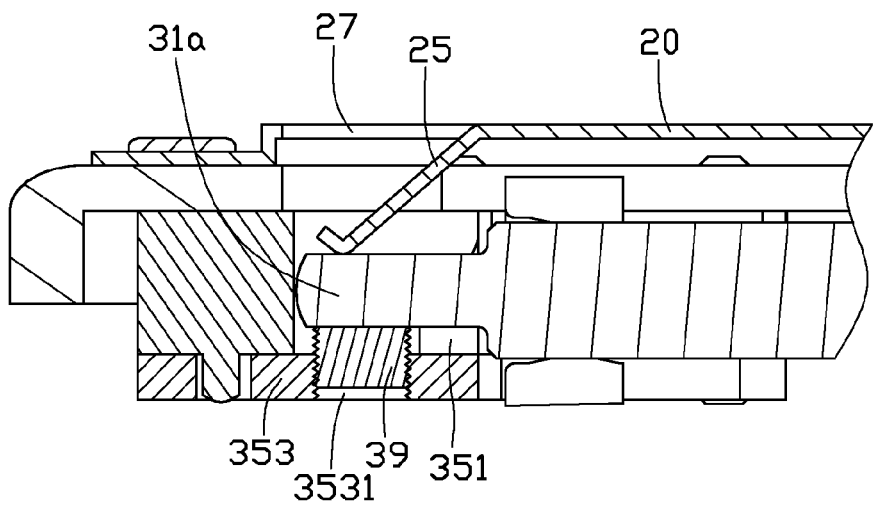
FIG. 5 is a cross-sectional view of the traverse module of FIG. 1, taken along line V-V of FIG. 1.

Referring to FIG. 5, the support plate 353 defines a threaded, through hole 3531 communicating with the cavity 3510 of the seat 351. An adjusting rod 39 is partly received in the threaded hole 3531 and protrudes from the support plate 353. The end 31a of the bar 30a resides on the adjusting rod 39. In the embodiment, the rod 39 has a sufficient size in cross section to stably support the end 31a.

Figure 2:
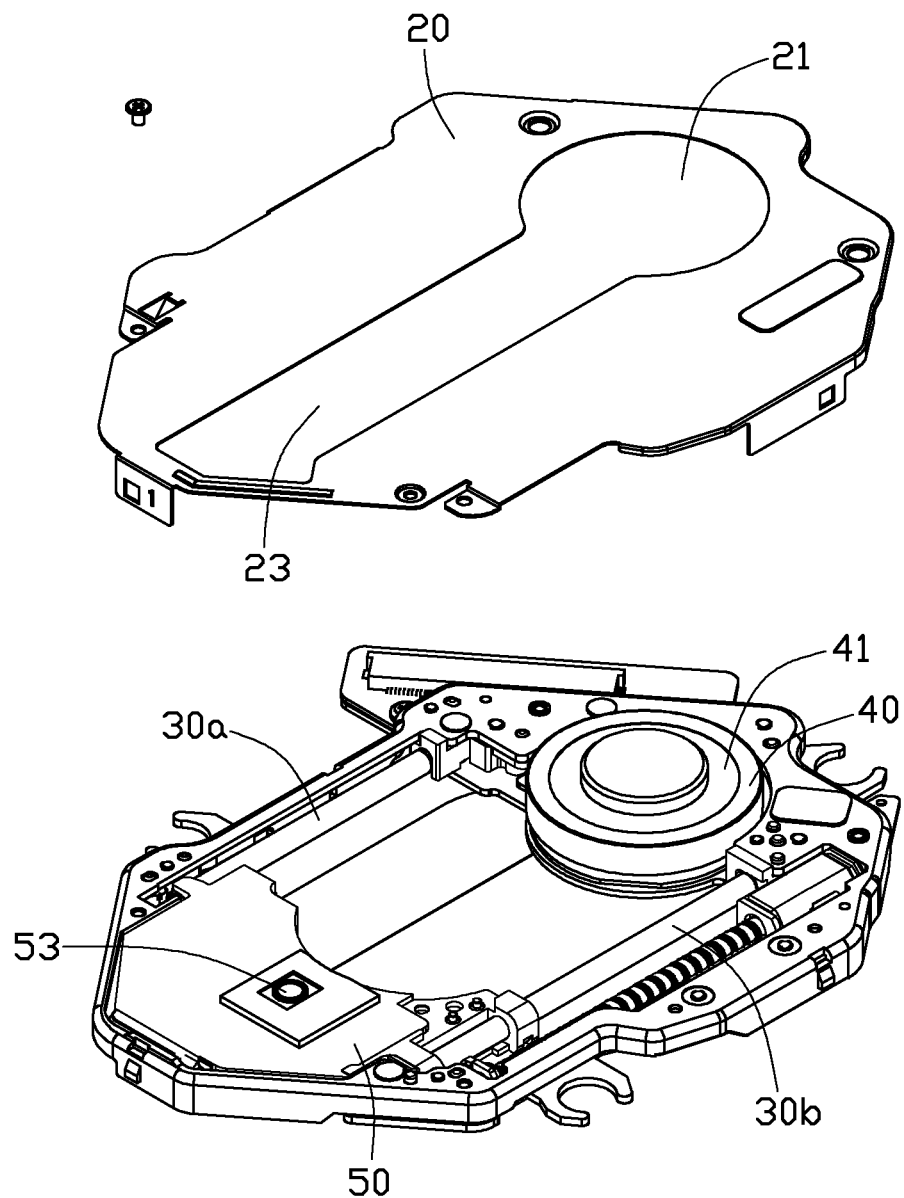
FIGS. 2-4 are isometric, exploded view of the traverse module of FIG. 1.

In the embodiment, the cover 20 is fixed to the base 10 by screws. In an alternative embodiment, the cover 20 may be fixed to the base 10 by any suitable connection technique, such as gluing. Referring to FIG. 2, the cover 20 defines a slot 23 extending along its lengthwise direction, and an opening 21 that communicates with the slot 23. The opening 21 is aligned with the opening 11 of the base 10 and receives a portion of the motor 40. The pickup head module 50 is slidably received in the slot 23 and can move along the lengthwise direction of the slot 23.

Figure 4:
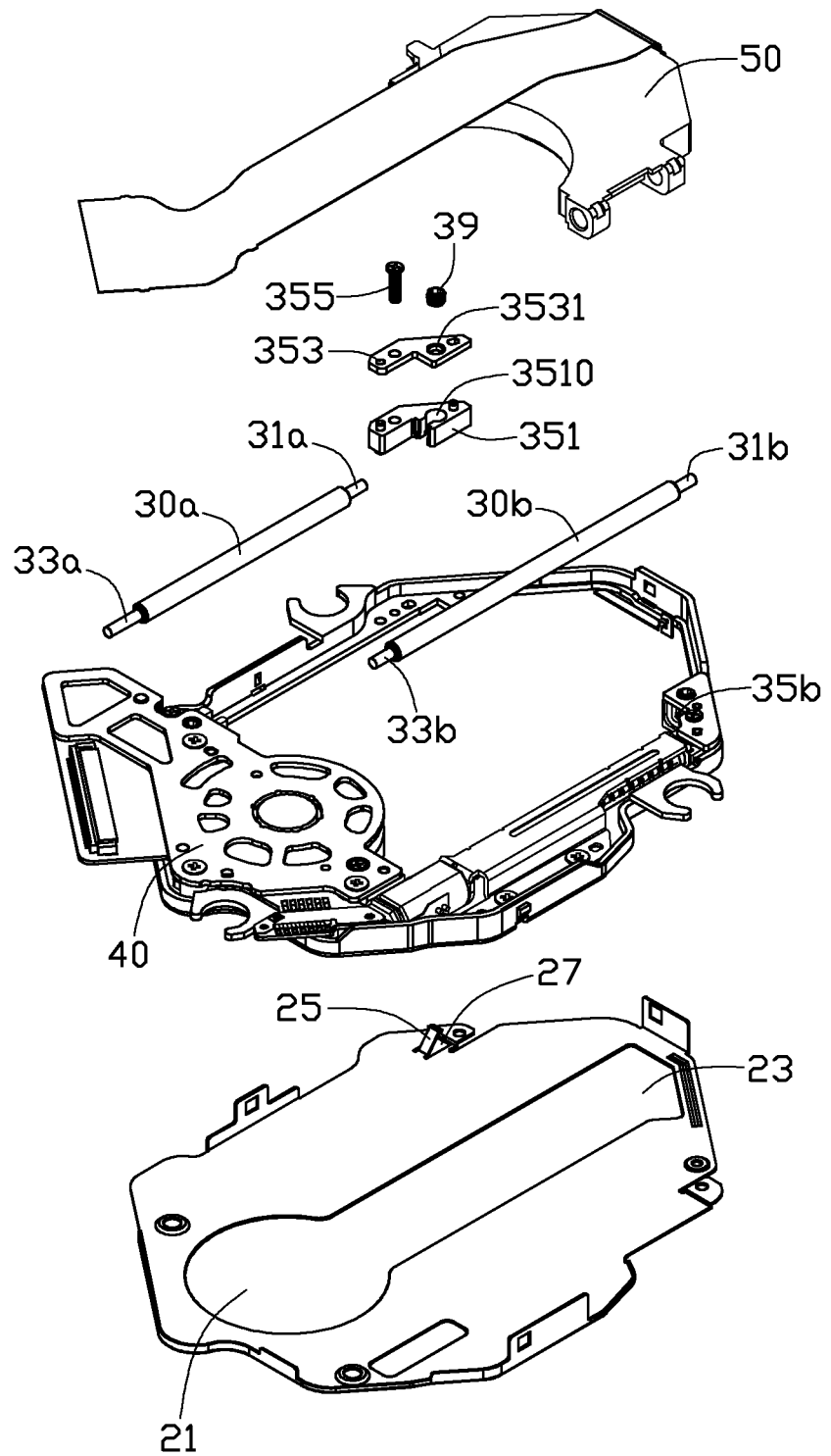

Referring again to FIG. 4, the cover 20 further defines a through hole 27, and a cantilevered spring tab 25 protruding downward from one edge of the through hole 27. The spring tab 25 is inclined with respect to the cover 20. Referring to FIG. 6, the free end of the spring tab 25 presses against the top of the end 31a of the guide bar 30a, thus holding the end 31a in position.

Referring again to FIG. 2, the motor 40 has a loading surface 41 to support an optical disc (not shown). A lens 53 is set on the pickup head module 50 to focus the light emitted by the pickup head module 50 on the optical disc on the loading surface 41.

When the light emitted by the pickup head module 50 is not perpendicular to the disc on the loading surface 41 of the motor 40, a user can turn the adjusting rod 39 to urge the end 31a of the guide bar 30a to move. The pickup head module 50 can then be adjusted to a proper orientation where the light emitted by the emitter of the pickup head module 50 is perpendicular to the optical disc on the loading surface 41.

In an alternative embodiment, the fixing members 35b, 37a, and 37b may have the same construction as the fixing member 35a. The ends 31b, 33a, and 33b can thus be moved by an adjusting rod similar to the adjusting rod 39, which allows the head module 50 to be adjusted in a wider range.

While various embodiments have been described and illustrated, the disclosure is not to be constructed as being limited thereto. Various modifications can be made to the embodiments by those skilled in the art without departing from the true spirit and scope of the disclosure as defined by the appended claims.

What is claimed is:

1. A traverse module of an optical disc drive, comprising:
a base;
a cover connected to the base and comprising a spring tab, wherein the spring tab is integrally formed with the cover;
a pair of guide bars connected to the base;
a pickup head module slidably connected to the guide bars; and
an adjusting member movably connected to the base;
wherein the adjusting member supports at least one of the guide bars, and the spring tab presses against the at least one of the guide bars, the adjusting member is able to urge the at least one of the guide bars to move;

the cover defines a through hole therein, the spring tab extends inward from an edge of the through hole and comprises a free end pressing against the at least one of the guide bars.

2. The traverse module of an optical disc drive according to claim 1, wherein the base comprises at least one fixing member, the adjusting member is fixed to the at least one fixing member and supports one end of the at least one of the guide bars.

3. The traverse module of an optical disc drive according to claim 1, wherein the adjusting member is screwed into the base.

4. The traverse module of an optical disc drive according to claim 2, wherein the adjusting member has a cross section larger than the cross section of the one end of the at least one of the guide bars.

5. An optical disc drive comprising:
 a traverse module comprising:
  a base;
  a cover connected to the base and comprising a spring tab, wherein the spring tab is integrally formed with the cover;
  a pair of guide bars connected to the base;
  a pickup head module slidably connected to the guide bars; and
  an adjusting member movably connected to the base;
 wherein the adjusting member supports at least one of the guide bars and the spring tab presses against the at least one of the guide bars, the adjusting member is able to urge the at least one of the guide bars to move;
 the cover defines a through hole therein, the spring tab extends inward from an edge of the through hole and comprises a free end pressing against the at least one of the guide bars.

6. The optical disc drive according to claim 5, wherein the base comprises at least one fixing member, the adjusting member is fixed to the at least one fixing member and supports one end of the at least one of the guide bars.

7. The optical disc drive according to claim 5, wherein the adjusting member is screwed into the base.

8. The optical disc drive according to claim 6, wherein the adjusting member has a cross section larger than the cross section of the one end of the at least one of the guide bars.

9. A traverse module of an optical disc drive, comprising:
 a base;
 a cover connected to the base and comprising a spring tab, the cover defining a through hole therein, the spring tab extending inwardly from an edge of the through hole and comprising a free end away from the edge;
 a pair of guide bars connected to the base;
 a pickup head module slidably connected to the guide bars;
 four fixing members connected to the base;
 four adjusting members, each of the four adjusting members being movably connected to one of the adjusting members;
 wherein one of the adjusting member supports one end of one of the guide bars, and the free end of the spring tab presses against the one of the guide bars, the adjusting member is configured to urge the at least one of the guide bars to move.

* * * * *